UNITED STATES PATENT OFFICE.

HENRY P. WEBB, OF BROOKLYN, NEW YORK.

IMPROVEMENT IN PAINTS FOR FILLING THE SEAMS OF VESSELS.

Specification forming part of Letters Patent No. 221,881, dated November 18, 1879; application filed March 25, 1879.

*To all whom it may concern:*

Be it known that I, HENRY P. WEBB, of the city of Brooklyn, in the county of Kings and State of New York, have invented a new and useful Compound forming an Elastic Seam-Paint, which compound is fully described in the following specification.

The nature and object of this invention is to provide a preparation for filling the seams of wooden vessels after having been calked with oakum or any other like substance.

It is a well-known fact that in the use of pitch or ordinary linseed-oil paints for seam-painting great difficulties occur, some of which are as follows:

Common pitch is liable to crack and drop out of the seams in extremely cold climates, leaving the oakum bare, and in hot climates it becomes heated and leaves the seams, defacing the sides of ships.

When linseed-oil paints are used—such as those containing white or red lead or any of the well-known pigments—another objection presents itself.

When the oakum in the seams of vessels is well covered or the seams filled the paint soon becomes very hard, and in case the planks shrink the paint does not swell correspondingly. The seam is thus not kept tight and leaks are caused.

It is also well known that linseed-oil is objectionable, because it is in its nature heating, and tends to burn the oakum.

In order to obviate these difficulties and objections and others, I have invented a seam-paint which will preserve oakum or wood, will fill the seams partially or wholly, is elastic and water-proof, will not crack or melt, and will expand and contract with the swelling or shrinking of the vessel's planks in the various climates.

The nature of my invention consists in the union of a quick-drying gum made of resin and its solvent with an earthy base, substantially such as herein described.

The process of preparation which I have adopted is as follows: First, I heat, in a kettle of suitable size, about forty pounds of common resin slowly until quite thin, nearly as thin as water. I then draw the fire and add while hot thirty-five gallons of naphtha (petroleum naphtha preferred) slowly, taking great care to stir all the time. This I let stand until cold, which produces about twenty-five gallons of a varnish-like gum. I then take a large vessel and place in it, say, two hundred and fifty pounds of any earthy pigment or base which has a good body, such as red oxide of iron (made by roasting ores) or ochers, and mix with the above about thirty gallons of the liquid above described. The composition is then ready for use, and will dry rapidly when applied; but if an extra quick drying composition is wanted, I add to the gum, before mixing with the base, about twenty gallons of ordinary Japan drier, thinning again with naphtha, if found necessary, to make it mix.

This composition is to be canned and hermetically sealed immediately, for when left open to the air it dries rapidly and becomes nearly solid, though elastic. It can be applied to the seams of vessels with a seam-brush, or a shell, such as is used with pitch.

The above quantities may be considerably varied, producing results of greater or less degrees of excellence.

Spirits of turpentine or any other diluent may be substituted in place of naphtha.

I am aware that it is not new to make a varnish composed of rubber and its solvents colored with different pigments, to which it has been proposed to add dissolved resin. Such varnish, however, is not adapted to be used for the same purpose as my compound, and its cost is such as would prevent its application in most instances as a filling, even if it were fitted for the purpose.

What I claim as new is—

1. A composition adapted for filling the seams of vessels, consisting of a quick-drying liquid-gum vehicle, composed of resin and its solvent, combined with an earthy base, substantially in the manner and for the purpose specified.

2. A composition adapted for filling the seams of vessels, consisting of a quick-drying liquid-gum vehicle, composed of resin dissolved in naphtha, combined with red oxide of iron, substantially in the manner and for the purpose specified.

HENRY P. WEBB.

Witnesses:
   SAML. R. BETTS,
   JOHN C. POSTLEY.